United States Patent [19]

Ostlie

[11] 4,313,742

[45] Feb. 2, 1982

[54] MULTIPLE ANGLE SINGLE STAGE SCRUBBER

[76] Inventor: L. David Ostlie, Rte. 1, Becker, Minn. 55308

[21] Appl. No.: 168,181

[22] Filed: Jul. 10, 1980

Related U.S. Application Data

[63] Continuation of Ser. No. 33,509, Apr. 26, 1979, abandoned.

[51] Int. Cl.³ .............................................. B01D 47/06
[52] U.S. Cl. ........................................ 55/241; 55/444; 261/111
[58] Field of Search ........... 55/223, 241, 242, 257 PF, 55/440, 444; 261/111, 112, DIG. 54

[56] References Cited

U.S. PATENT DOCUMENTS

| | | | |
|---|---|---|---|
| 1,117,309 | 11/1914 | Bentz | 55/242 |
| 1,616,802 | 2/1927 | Hosch | 55/440 |
| 2,002,553 | 5/1935 | Somers | 55/241 |
| 2,180,586 | 11/1939 | Gustafsson | 55/223 |
| 2,266,335 | 12/1941 | Roche, Jr. et al. | 55/241 |
| 2,583,390 | 1/1952 | Paasche | 55/223 |
| 3,116,989 | 1/1964 | Warren | 261/111 |
| 3,150,211 | 9/1964 | Murray et al. | 261/112 |
| 3,237,381 | 3/1966 | Hvostoff et al. | 261/36 R |
| 3,552,727 | 5/1971 | Ortgies | 55/241 |
| 3,584,440 | 6/1971 | Vigil | 55/241 |
| 3,708,266 | 1/1973 | Gustavsson | 55/249 |
| 3,795,486 | 3/1974 | Ekman | 55/257 |
| 4,159,196 | 6/1979 | Schneider et al. | 55/444 |

FOREIGN PATENT DOCUMENTS

| | | | |
|---|---|---|---|
| 684545 | 6/1930 | France | 55/241 |
| 204274 | 9/1923 | United Kingdom | 55/241 |
| 358102 | 10/1931 | United Kingdom | 55/241 |

OTHER PUBLICATIONS

How To Choose A Particulate Scrubber, Chemical Engineering, Aug. 29, 1977, pp. 54–68.

Primary Examiner—David L. Lacey
Attorney, Agent, or Firm—Schuyler, Banner, Birch, McKie & Beckett

[57] ABSTRACT

A scrubber for cleansing flue gases is disclosed. The scrubber includes a housing which defines a channel. The channel includes a scrubber stage wherein vertically spaced rows of deflecting members of L-shaped cross-section are disposed. In a given row of deflecting members, a plurality of flow paths are defined between horizontally adjacent deflecting members. Each deflecting member has an upper arm and a lower arm. The lowermost edge of the lower arms of the deflecting members in one row are disposed between vertical projections from the uppermost edges of upper arms of deflecting members in a row below the last mentioned row.

5 Claims, 8 Drawing Figures

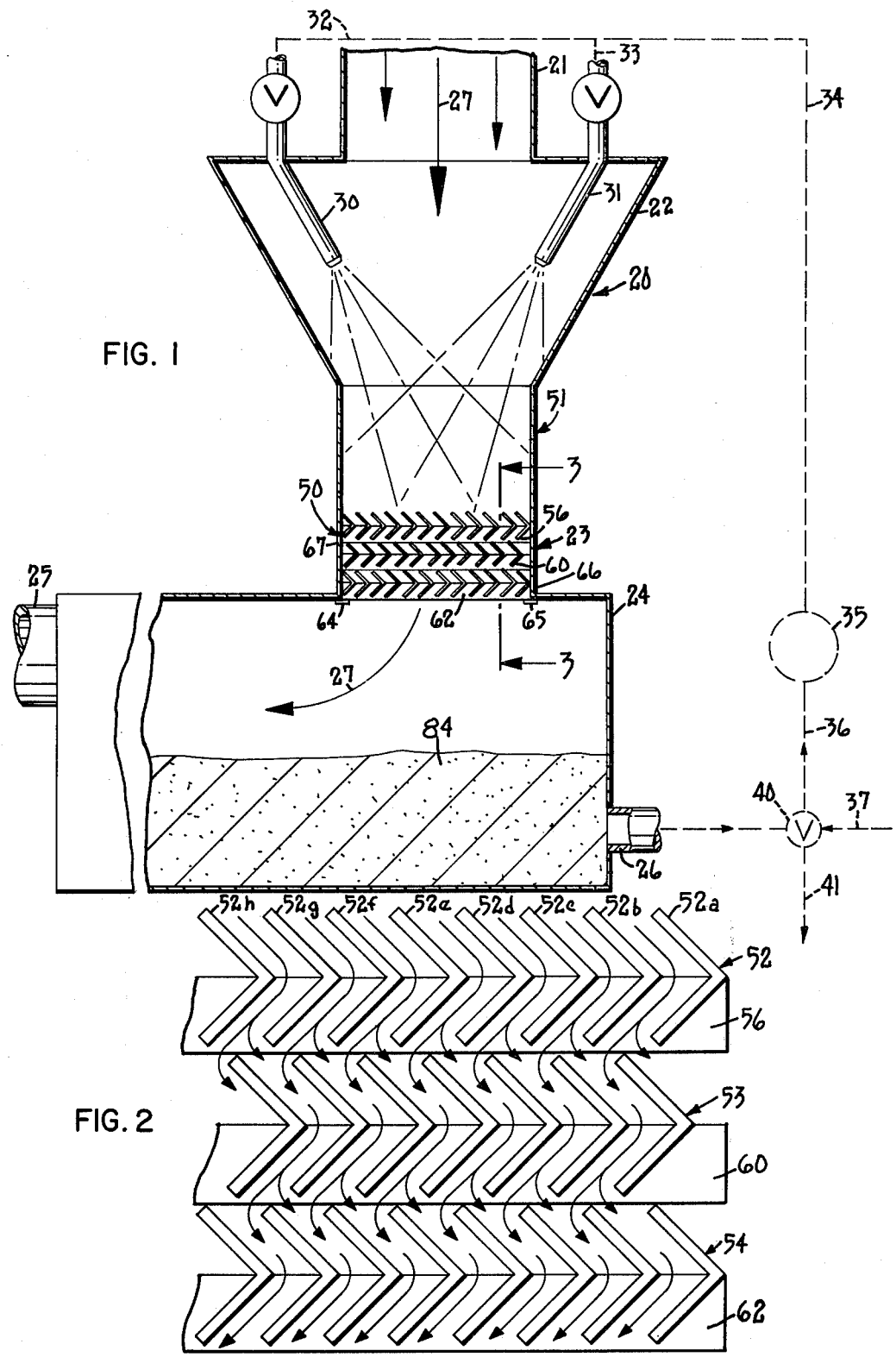

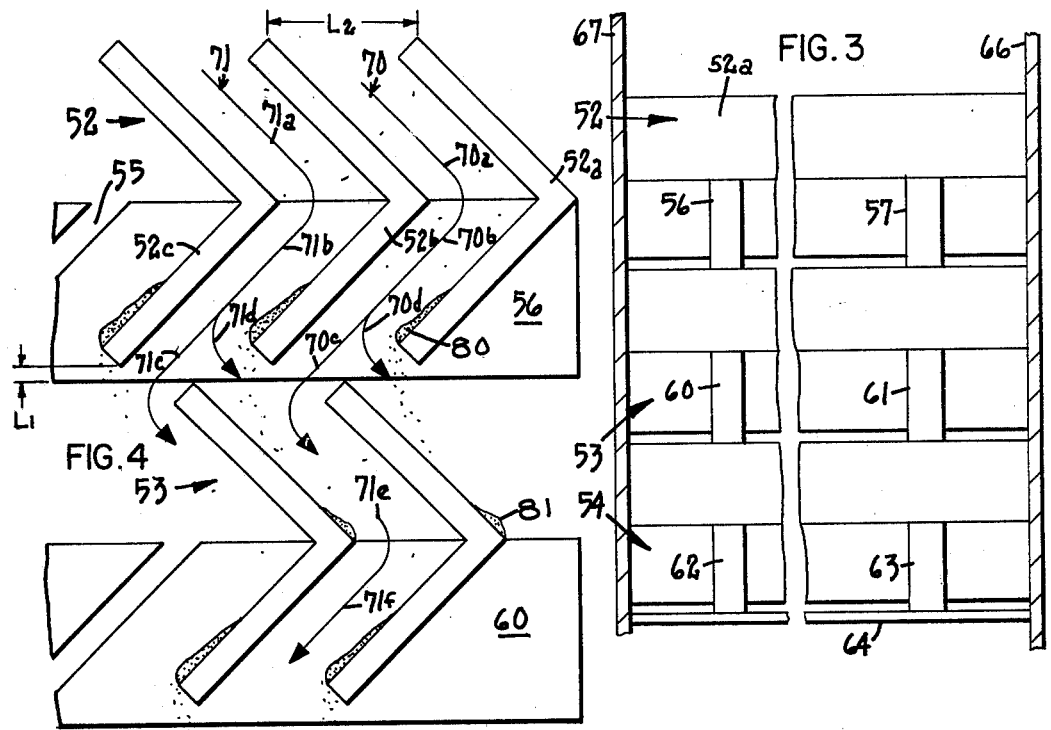
FIG. 3
FIG. 4
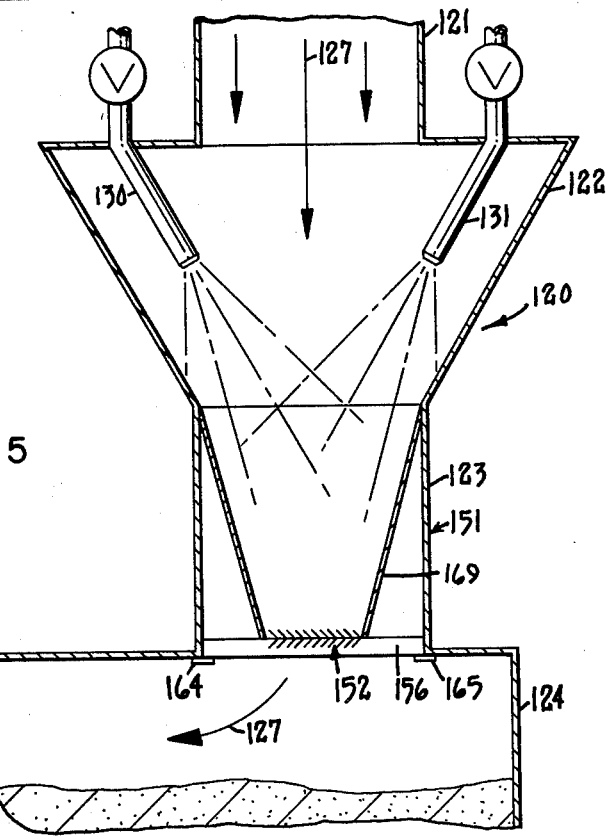
FIG. 5

MULTIPLE ANGLE SINGLE STAGE SCRUBBER

This is a continuation of application Ser. No. 33,509, filed Apr. 26, 1979, now abandoned.

TECHNICAL FIELD

This invention relates to the field of chemical engineering, and particularly to the art of bringing a large volume of gas into intimate contact with a large volume of liquid, as is necessary, for an example, in the process of cleaning flue gases to remove fly ash and sulphur dioxide.

BACKGROUND OF PRIOR ART

The flue gases originating from coal or oil fired combustion systems contain particulate matter, in the form of "fly ash", as well as oxidation products such as sulphur dioxide, in such quantity as to make their discharge directly into the ambient atmosphere unacceptable.

It is known that flue gases can be cleaned by contact with a scrubbing liquid which comprises a slurry of calcium carbonate in water, as taught in U.S. Pat. No. 3,795,486 to Frank A. Ekman. In order to accomplish the desired degree of cleansing in intervals of acceptably short length, and using apparatus of practical size, it is necessary that the contact between the gas and the liquid be of great intimacy, and to accomplish this it has been suggested to provide arrays of elongated, parallel, spaced rod-like elements extending across a flow chamber, downstream of the admission site for slurry, to substantially restrict the cross sectional area of the gas flow and to enturbulate the flow by introducing eddys and cross currents. The elements quickly become wet with the treating slurry, to increase the area of liquid-to-gas contact, and the eddys and cross currents cause sharp changes in the direction of gas flow to inertially precipitate particulate matter upon the wet surfaces, from which it is carried away with the liquid as it drips off.

SUMMARY OF THE INVENTION

I have discovered that a great improvement in the cleansing process results when the cross members are not of circular cross section, but rather are of "angle iron", L-shaped in section, spaced and oriented in a particular manner as will be explained more fully below, and that plurals rows of such angle irons may be spaced and oriented to still further enhance the cleaning process without unduly restricting gas flow.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there are illustrated and described certain preferred embodiments of the invention.

BRIEF DESCRIPTION OF THE DRAWING

In the drawing,

FIG. 1 is a view in vertical section of a scrubber embodying my invention;

FIGS. 2 and 3 are fragmentary end and side views, to a larger scale, of a scrubber stage embodying the invention, the latter figure being taken generally along the line 3—3 of FIG. 1;

FIG. 4 is a fragmentary view like FIG. 2 to a still larger scale;

FIG. 5 is a view like FIG. 1 showing a modified embodiment of the invention;

DESCRIPTION OF THE PREFERRED EMBODIMENTS

Figure 6:
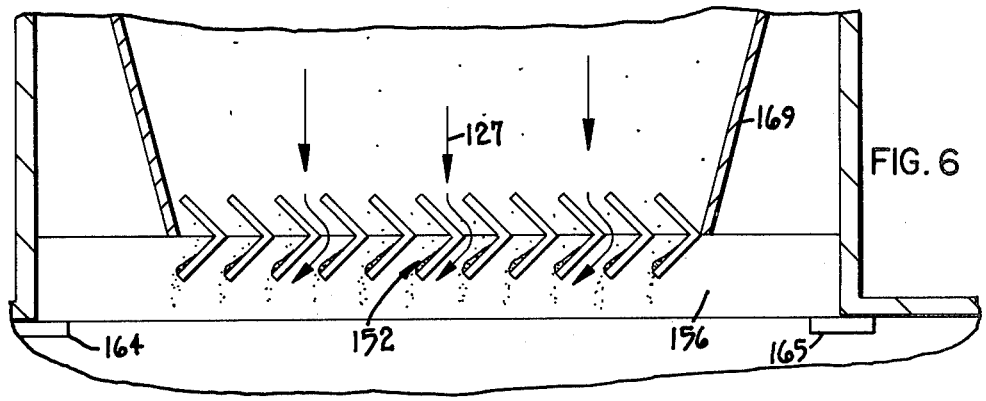
FIG. 6 is an enlarged view of a portion of FIG. 5.

Referring first to FIG. 1, a scrubber according to the invention is shown to comprise a housing 20 having an input duct 21 for gases and said housing 20 provides a channel for flow of gases to be cleaned having the housing 20, and, therefore, the channel defined by it, includes a spray chamber 22 for admitting scrubbing liquid and a scrubber stage 23. The housing 20 further includes a receiver 24 in which the liquid and gas effluent from stage 23 are separated, the latter for conduction to a secondary treatment stage, if necessary, through a duct 25, and the former for recirculation or disposal through a return conduit 26. The direction of movement of the flue gases, under the impetus of suitable air moving equipment not shown, is shown by the arrows 27.

The scrubbing liquid is supplied to nozzles 30, 31, through conduits 32, 33, and 34 by a pump 35 having an inlet conduit 36 which may draw liquid either from return conduit 26 or from a source of such liquid, not shown, through a supply conduit 37 in accordance with the operation of valving means 40 which can also connect return conduit 26 to a disposal conduit 41.

Scrubber stage 23 is shown in FIG. 1 to comprise an array 50 of deflecting members extending across an air flow channel 51 and seen in transverse section: in the embodiment of FIGS. 1-4 the array comprises three rows 52, 53, and 54 of deflecting members. Thus, row 52 is shown in FIG. 1 to comprise 12 members. The members of row 52 are shown in FIG. 2 as 52a, 52b, . . . received in equally spaced diagonal slots 55 formed at an angle of 45° in a set of support bars 56, 57 and symmetrical about common axes parallel to the support bars. Similarly, the members of row 53 are received in slots in support bars 60 and 61, and those of row 54 are received in slots in support bars 62, 63.

The apices of the members in each row are aligned in the same direction along the axis. Bars 62 and 63 are supported on ledges 64, 65 at the bottom of channel 51. Bars 60 and 61 rest on the tops of the members of row 54, and bars 56, 57 rest on the tops of the members of row 53. Note that the apex of member 52a is substantially in contact with wall 66 of channel 51: the extremities of member 52h are substantially in contact with wall 67 of channel 51. The same is preferably true of the end members of row 54.

The operation of this embodiment of the invention will now be evident. Scrubbing liquid is emitted from nozzles 30, 31 into chamber 22 and flue gases enter the chamber at 21. Liquid is supplied in such volume that the surfaces of the deflecting members are quickly coated, the surplus dropping to the bottom of receiver 24. The flow of gas from conduit 21 is divided in scrubber stage 23 into a plurality of separate streams, 70, 71, . . . (see FIG. 4) which have components of motion first to the right, 70a, 71a, and then to the left, 70b, 71b as seen in FIG. 4. Particulate matter is inertially separated from the gas at the angle between these motions, to impinge and be trapped on the wet surfaces of the deflecting members. With time the trapped particles migrate to the bottoms of the deflecting members as shown at 80 in FIG. 4, and drip off with surplus liquid to eventually fall to the bottom of receiver 24 at 84 (FIG. 1).

Referring again to FIG. 4, it is evident that a space exists between the tops of the deflection members of rows 53 and the bottoms of the deflection members in row 52, the size $L_1$ of this space being determined by the depths to which the diagonal slots 55 are cut. This dimension, and the mutual spacing $L_2$ between deflecting members of the same row, are parameters which can be varied in accordance with the needs of particular situations.

As shown in FIG. 4, the separate streams 70b, 71b are again separated, with turbulence, by their mutual aerodynamic pressures, near the bottoms of deflecting members 52a, 52b, ... into subordinate streams 70c, 70d and 71c, 71d. Streams 70c and 71d merge, with turbulence, in a stream which undergoes a second sharp change in direction, from right at 71e to left at 71f. The same effect occurs in the space between rows 53 and 54.

The proximity of deflecting member 52a to wall 66, and that of deflecting member 52h to wall 67, prevents any significant flow of undeflected gases along the walls.

In the embodiment of the invention thus far described, scrubber 23 comprises a plurality of rows of deflecting members which do, of course, add somewhat to the restriction to gas flow presented by the stage. This extent of cleaning is not always necessary. FIGS. 5 and 6 show a scrubber embodying a single row of deflecting members: elements in these figures which are the same as elements in FIG. 1 are given the same reference numerals in the 100 series.

Here, the array of deflecting members is reduced to a single row 152 supported in diagonal slots in cross bars, one of which is shown at 156, supported by ledges 164 and 165. As an added feature, scrubber stage 123, which is disposed in the channel defined by the housing 120, includes a converger 169 or rudimentary venturi to increase the speed of the gases as they reach deflection members of row 152, so as to increase the amount of turbulence imparted to the gases and thus the intimacy of their contact with scrubbing liquid as well as the magnitude of the inertial separation of particulate matter.

Figure 7:
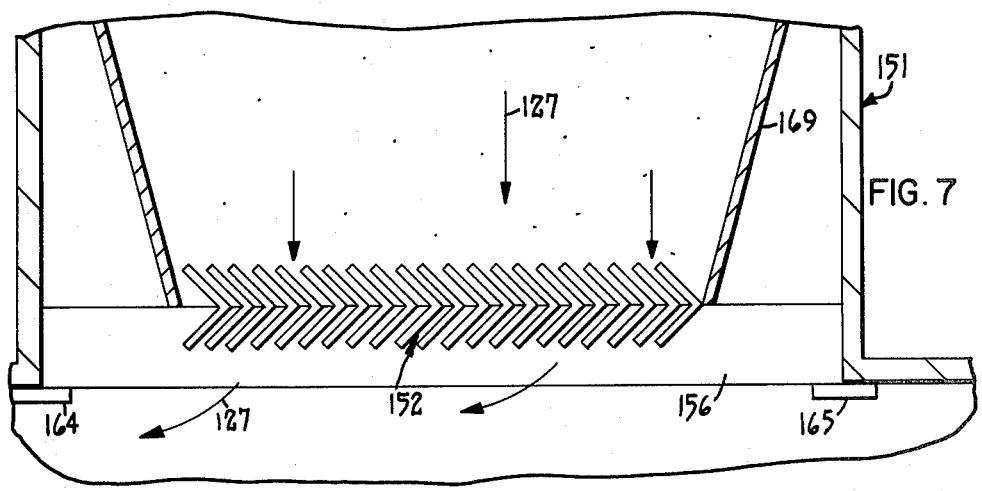

FIG. 7 shows that the structure of FIG. 6 can be modified if desired by decreasing the spacing between the diagonal slots and hence the spacing between the deflection members.

Figure 8:
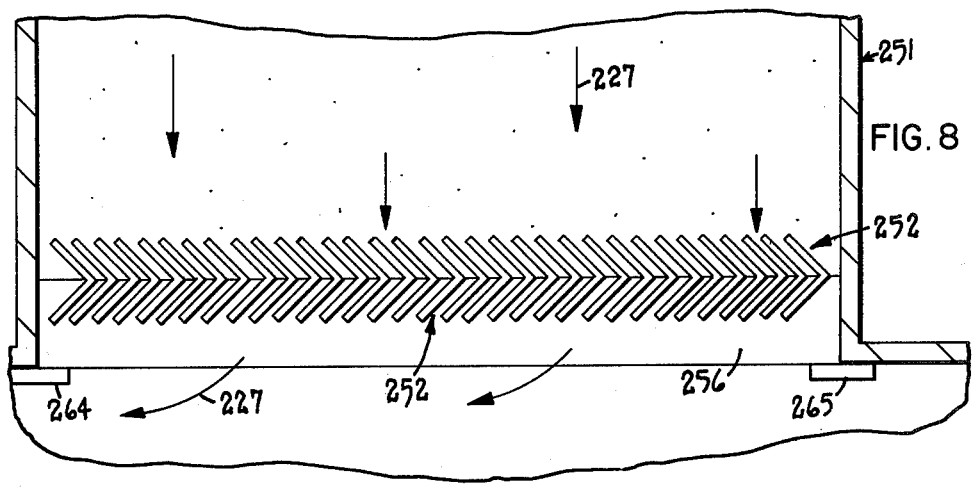
FIGS. 7 and 8 are views like FIG. 6 showing further modified embodiments of the invention.

FIG. 8 shows that even without the presence of a converger, it is possible to vary the operation of the equipment, to meet specific needs, but substituting a single row of closely spaced deflection members for three rows of these members.

From the foregoing it will be evident that I have invented an improved scrubbing stage and an improved gas scrubber using such a stage. The invention centers about the appreciation that one or more rows of deflecting members of L-shaped cross section are capable of performing the functions of conventional deflecting members of circular section more efficiently and with less restriction of the flow of gases, by enabling inertial separation of particulate matter, improving the trapping of such particles in scrubbing liquid, and increasing the enturbulation of the gases flowing through the scrubber, and hence their intimacy of contact with the scrubbing liquid.

Numerous characteristcs and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent extended by the broad general meaning of the terms in which the appended claims are expressed.

What is claimed is:

1. A scrubber for cleansing flue gases comprising, in combination:

a channel having a flue gas inlet adjacent an upper end of the channel and a flue gas outlet disposed below said inlet, said channel extending generally vertically for guiding the flue gases downwardly from said inlet to said outlet;

means in said channel for introducing scrubbing liquid into gas flowing downwardly in said channel whereby said liquid and gases flow generally downwardly concurrently;

a scrubber stage in said channel below the last-named means for causing intimate contact between the gases and the liquid, said scrubber stage comprising an array of deflecting means extending across said channel, said deflecting means including first and second rows of generally parallel, generally horizontal deflecting members of generally L-shaped cross-section;

mounting means for supporting said first row of members above said second row of members in a vertically spaced generally parallel relationship, with said members in mutually spaced generally parallel relation with the vertices of said members directed along a horizontal axis to which said members are transverse whereby a plurality of flow paths are defined by adjacent ones of said members;

each of said deflecting members of said first and second rows having an upper arm and a lower arm extending downwardly at an angle therefrom, adjacent pairs of said upper arms defining a flow inlet to a respective one of said flow paths and adjacent pairs of said lower arms defining a flow outlet from a respective one of said flow paths, an uppermost edge of each of said upper arms of said second row of deflecting members being disposed in an area between a vertical projection from a lowermost edge of adjacent lower arms of said first row of deflecting members whereby downwardly flowing gases and liquid exiting one of the flow paths defined by members of said first row are divided into two streams by one of said uppermost edges to enter the flow inlet on either side of said last-mentioned uppermost edge;

means below said scrubber stage for thereafter separating the liquid from the gases and said separating means having clean gas outlet means.

2. A scrubber according to claim 1 wherein said deflecting means includes at least a third row of said deflecting members, each of said deflecting members of said at least third row having an upper arm and a lower arm extending downwardly at an angle therefrom, adjacent deflecting members of said third row defining between them a flow path for the downwardly moving gases and liquid, adjacent pairs of said upper arms of said at least third row defining a flow inlet to a respective one of said flow paths of said at least third row and adjacent pairs of said lower arms defining a flow outlet from a respective one of said flow paths of said at least third row, an uppermost edge of each of said arms of said at least third row being disposed in an area between a vertical projection from a lowermost edge of adjacent lower arms of said second row whereby downwardly flowing gases and liquids exiting one of the flow paths defined by members of said second row are divided into two streams by one of said last-mentioned uppermost edges to enter one of the flow inlets of said at least third row on either side of said last-mentioned uppermost edge.

3. A scrubber according to claim 1 or 2 in which said channel includes means for increasing the rate of flow of the gases as they enter the scrubber stage.

4. A scrubber according to claim 1 or 2 wherein said mounting means is comprised of a plurality of support bars extending across said channel and having aligned downwardly diagonal slots for receiving said lower arms of said deflecting members.

5. A scrubber according to claim 1 or 2 wherein the upper and lower arms of each deflecting member are of equal length and wherein the upper and lower arm of each deflecting member are disposed at right angles to one another.

* * * * *